United States Patent
Hayward et al.

(10) Patent No.: US 6,798,997 B1
(45) Date of Patent: Sep. 28, 2004

(54) SUPPLY ORDERING APPARATUS

(75) Inventors: Ken Hayward, Brockport, NY (US); Marc J. Krolczyk, Rochester, NY (US); Dawn M. Marchlonda, Marion, NY (US)

(73) Assignee: Xerox Corporation, Stamford, CT (US)

(*) Notice: Subject to any disclaimer, the term of this patent is extended or adjusted under 35 U.S.C. 154(b) by 173 days.

(21) Appl. No.: 09/662,198

(22) Filed: Sep. 14, 2000

Related U.S. Application Data

(63) Continuation-in-part of application No. 09/397,126, filed on Sep. 16, 1999.

(51) Int. Cl.[7] .............................................. G03G 15/00
(52) U.S. Cl. ........................ 399/12; 705/27; 709/224; 347/50; 399/24
(58) Field of Search ...................... 705/26, 27; 399/24, 399/12

(56) References Cited

U.S. PATENT DOCUMENTS

| | | | |
|---|---|---|---|
| 4,496,237 A | 1/1985 | Schron | 355/14 C |
| 4,961,088 A | 10/1990 | Gilliland et al. | 355/206 |
| 5,016,171 A | 5/1991 | Connolly et al. | 364/406 |
| 5,281,999 A | 1/1994 | Edmunds | 355/202 |
| 5,283,613 A | 2/1994 | Midgley, Sr. | 355/203 |
| 5,305,199 A | 4/1994 | LoBiondo et al. | 364/403 |
| 5,572,292 A | 11/1996 | Chatani et al. | 399/25 |
| 5,636,032 A | 6/1997 | Springett | 358/296 |
| 5,794,094 A * | 8/1998 | Boockholdt et al. | 399/27 |
| 5,799,157 A * | 8/1998 | Escallon | 395/227 |
| 5,802,420 A * | 9/1998 | Garr et al. | 399/27 |
| 5,809,375 A | 9/1998 | Owens, Jr. et al. | 399/111 |
| 5,828,864 A | 10/1998 | Danknick et al. | 395/500 |
| 5,835,817 A | 11/1998 | Bullock et al. | 399/25 |
| 5,896,497 A | 4/1999 | Halstead | 395/186 |
| 5,901,286 A * | 5/1999 | Danknick et al. | 395/200.33 |
| 5,999,761 A * | 12/1999 | Binder et al. | 399/49 |
| 6,000,773 A | 12/1999 | Murray et al. | 347/7 |
| 6,003,078 A * | 12/1999 | Kodimer et al. | 709/224 |
| 6,016,409 A | 1/2000 | Beard et al. | 399/33 |
| 6,018,719 A * | 1/2000 | Rogers et al. | 705/24 |

(List continued on next page.)

FOREIGN PATENT DOCUMENTS

| | | | | |
|---|---|---|---|---|
| EP | 0 838 768 A2 | | 4/1998 | |
| EP | 0 843 229 A2 * | | 5/1998 | G03G/15/00 |
| EP | 0 838 768 A2 * | | 5/1999 | G06F/17/30 |
| WO | WO 99 06910 | | 2/1999 | |
| WO | WO 99 17210 | | 4/1999 | |

OTHER PUBLICATIONS

ICOC's, Linking the worlds of print and electronic media. Sep. 11, 1998.*
IBM technical disclosure, Disk drive with embedded hypertext markup language server, vol. 38. No. 12, Dec. 12, 1995.*
Digital Signature Standard (DSS); U.S. Department of Commerce/National Institute of Standards and Technology; Jan. 27, 2000; 74 pages.
Fips Pub 186—Digital Signature Standard (DSS); U.S. Department of Commerce/National Institute of Standards and Technology; May 19, 1994; 18 pages.

*Primary Examiner*—Jeffrey A. Smith
*Assistant Examiner*—M A Fadok
(74) *Attorney, Agent, or Firm*—Andrew D. Ryan

(57) ABSTRACT

An automatic supply ordering system for electronically ordering a consumable component or replaceable part in a marking machine. The system provides electronic identification of a condition of a replaceable component and automatically electronically sends an offer to purchase a replacement part upon identification of a threshold condition.

23 Claims, 7 Drawing Sheets

U.S. PATENT DOCUMENTS

| | | | |
|---|---|---|---|
| 6,023,593 A * | 2/2000 | Tomidokoro | 399/8 |
| 6,045,206 A | 4/2000 | Igval | 347/2 |
| 6,065,824 A | 5/2000 | Bullock et al. | 347/19 |
| 6,106,088 A | 8/2000 | Wafler | 347/7 |
| 6,141,507 A | 10/2000 | Sawada | 399/8 |
| 6,158,837 A | 12/2000 | Hilton et al. | 347/19 |
| 6,170,007 B1 * | 1/2001 | Venkatraman | 709/218 |
| 6,177,948 B1 * | 1/2001 | Estabrooks et al. | 347/129 |
| 6,233,408 B1 | 5/2001 | Allen | 399/8 |
| 6,233,409 B1 * | 5/2001 | Haines et al. | 399/10 |
| 6,264,301 B1 | 7/2001 | Helterline et al. | 347/19 |
| 6,271,928 B1 | 8/2001 | Bullock et al. | 358/1.16 |
| 6,289,371 B1 | 9/2001 | Kumpf et al. | 709/203 |
| 6,293,144 B1 * | 9/2001 | Froger et al. | 73/304 |
| 6,295,423 B1 * | 9/2001 | Haines et al. | 399/24 |
| 6,302,527 B1 * | 10/2001 | Walker | 347/50 |
| 6,312,106 B1 | 11/2001 | Walker | 347/50 |
| 6,333,790 B1 * | 12/2001 | Kageyama | 358/1.15 |

* cited by examiner

SUPPLY ORDERING APPARATUS

This application is a continuation-in-part of U.S. application Ser. No. 09/397,126, filed Sep. 16, 1999, the disclosure of which is totally incorporated by reference.

FIELD OF THE INVENTION

This invention relates to an intelligent ordering system for replacement consumable components in imaging and marking apparatus. Reference is also made to co-pending continuation-in-part application, Ser. No. 09/662,284, entitled, METHOD FOR SUPPLY ORDERING, filed concurrently herewith. The present application also relates to U.S. application Ser. No. 09/397,125, filed Sep. 16, 1999. The above applications are incorporated herein by reference in their entireties.

BACKGROUND OF THE INVENTION

Many imaging machines including, for example, fax, copier, printer, scanner device, xerographic device, electrostatographic device generally provide user assistance that indicate one or more error conditions. For example, lights such as small LCD (liquid crystal display) often indicate a variety of error conditions. Typically, a user reads an error code from the LCD, looks up the error code in, a machine's user manual, and then calls the manufacturer's toll free help line for an explanation of the code or instructions on what to do to fix the error condition.

FIG. 1 depicts a typical machine 10 connected to a known computer 30 over a bus 32. Machine 10 includes sensors 12 to detect conditions (e.g., paper tray empty). Sensors 12 and machine state flags 14 (e.g., warm up or not ready) describe the state of the machine. Firmware 16 reads the state of the machine and forms an error code number. A code handler 22 of user interface 20 receives the error code and causes it to be displayed on status monitor 24.

Various monitoring systems and machines are disclosed in U.S. Pat. Nos. 6,016,409; 6,106,088; 6,045,206; 6,000,773; 5,901,286; 5,809,375; 5,802,420; 5,636,032; 5,572,292; 5,305,199; 5,283,613, 5,281,999; 5,016,171; 4,961,088; and 4,496,237.

All documents cited herein, including the foregoing, are incorporated herein by reference in their entireties.

SUMMARY OF THE INVENTION

The present invention relates to a system for automatically ordering consumable supplies for a marking apparatus.

In accordance with one aspect of the present invention, there is provided, an automated electronic order system including a consumable component, sensor, processor and software logic system, and communications link. The automated electronic order system communicates with the consumable component and predicts a future condition of the consumable component. The communications link is associated with the sensor and the processor and software logic system. The sensor, processor and software logic system, and the communications link interrogate the one consumable component and, upon identifying a particular condition of the consumable component, automatically communicate an electronic inquiry or an electronic offer to purchase a replacement of the consumable component.

In accordance with another aspect of the present invention, there is provided, an imaging apparatus system including a consumable part, sensor, processor, communications system, and an output device. The system identifies and electronically communicates a condition of the consumable part. The output device electronically communicates the condition of the consumable part to a user, supplier, or third party.

In accordance with another aspect of the present invention, there is provided, an imaging apparatus including a consumable part. The consumable part has a first condition upon installation, at least one intermediate condition after use, and a third condition when a replacement of the consumable part is substantially necessary. A software and sensor system electronically monitors the condition of the consumable part; sends a signal relating to the condition of the consumable part to a device; and electronically communicates an offer to purchase a consumable part at an occurrence of one of the first condition, intermediate condition, or third condition.

In accordance with another aspect of the present invention, there is provided, an imaging apparatus including a replaceable part, a processor, and a communications link. The processor includes logic to monitor a condition of the replaceable part and initiates an electronic communication of an offer to purchase a replacement for the replaceable part upon identification of a threshold condition in the replaceable part.

In accordance with another aspect of the present invention, there is provided, a marking apparatus including a sensor and software system that electronically senses a condition in the device and electronically communicates information relating to the condition to an address (URL, e-mail, facsimile, telephone, mail, etc.) defined by the condition. The sensor and software system includes logic to initiate a purchase order defined by the condition.

In accordance with another aspect of the present invention, there is provided, an imaging apparatus including a development station and replaceable parts. A sensor and software system electronically senses a condition in the replaceable part and electronically communicates information relating to the condition to an address defined by the condition. The sensor and software system includes identified indicia relating to purchase information for the replaceable part and the logic then automatically initiates an offer to purchase the replaceable part. The indicia includes at least one of a method of shipment, shipping address, phone number, address, method of payment, authorization code, and credit card account number. The imaging apparatus automatically electronically communicates an offer to purchase a replacement part for the replaceable part upon occurrence of a defined threshold condition. Additional contact information such as return electronic address and facsimile number may also be included.

In accordance with another aspect of the present invention, there is provided, a cartridge for use in an electrostatographic apparatus. The cartridge includes a housing and a sensor and software system including programmed logic functions. The sensor and software system is associated with the housing. The sensor and software system electronically identifies a present or future condition in the cartridge and electronically communicates information relating to the identified condition to an address defined by the condition. The sensor and software system automatically offers to purchase a replacement for the cartridge upon identification of a threshold condition in the cartridge.

Still other objects and advantages of the present invention will become readily apparent to those skilled in the art from the following detailed description, wherein embodiments are shown and described, simply by way of illustration contemplated of carrying out the invention. As will be realized, the invention is capable of other and different embodiments, and its several details are capable of modification in various obvious respects, all without departing from the invention. Accordingly, the drawing and description are to be regarded as illustrative in nature, and not as restrictive.

DETAILED DESCRIPTION OF THE INVENTION

While the principles and embodiments of the present invention will be described in connection with marking apparatus such as electrostatographic and xerographic reproduction machines, and their associated peripherals, it should be understood that the present invention is not limited to that embodiment or to that application. Therefore, it should be understood that the principles of the present invention and embodiments extend to all alternatives, modifications, and equivalents thereof.

Figure 1:
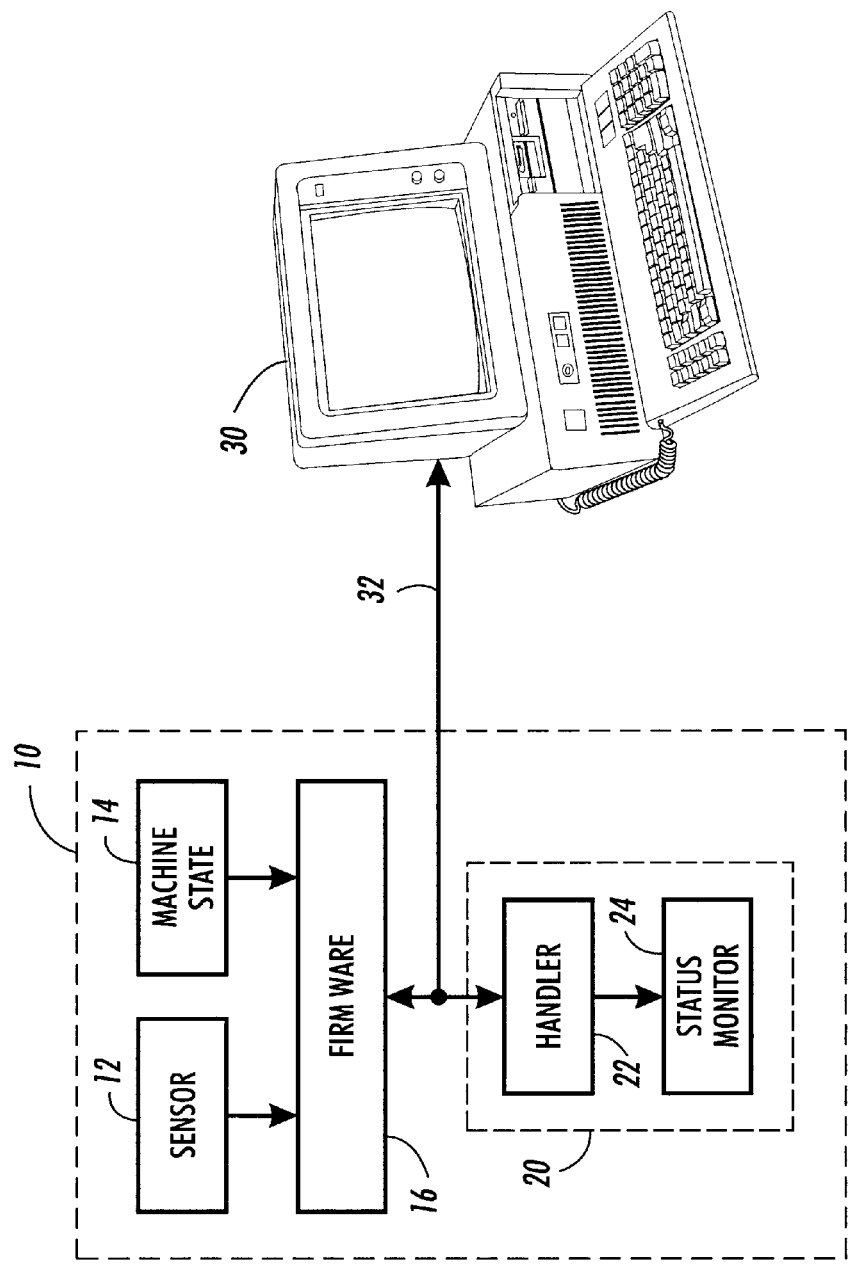
FIG. 1 is a block diagram of a user interface of a known computer peripheral.
Figure 2:
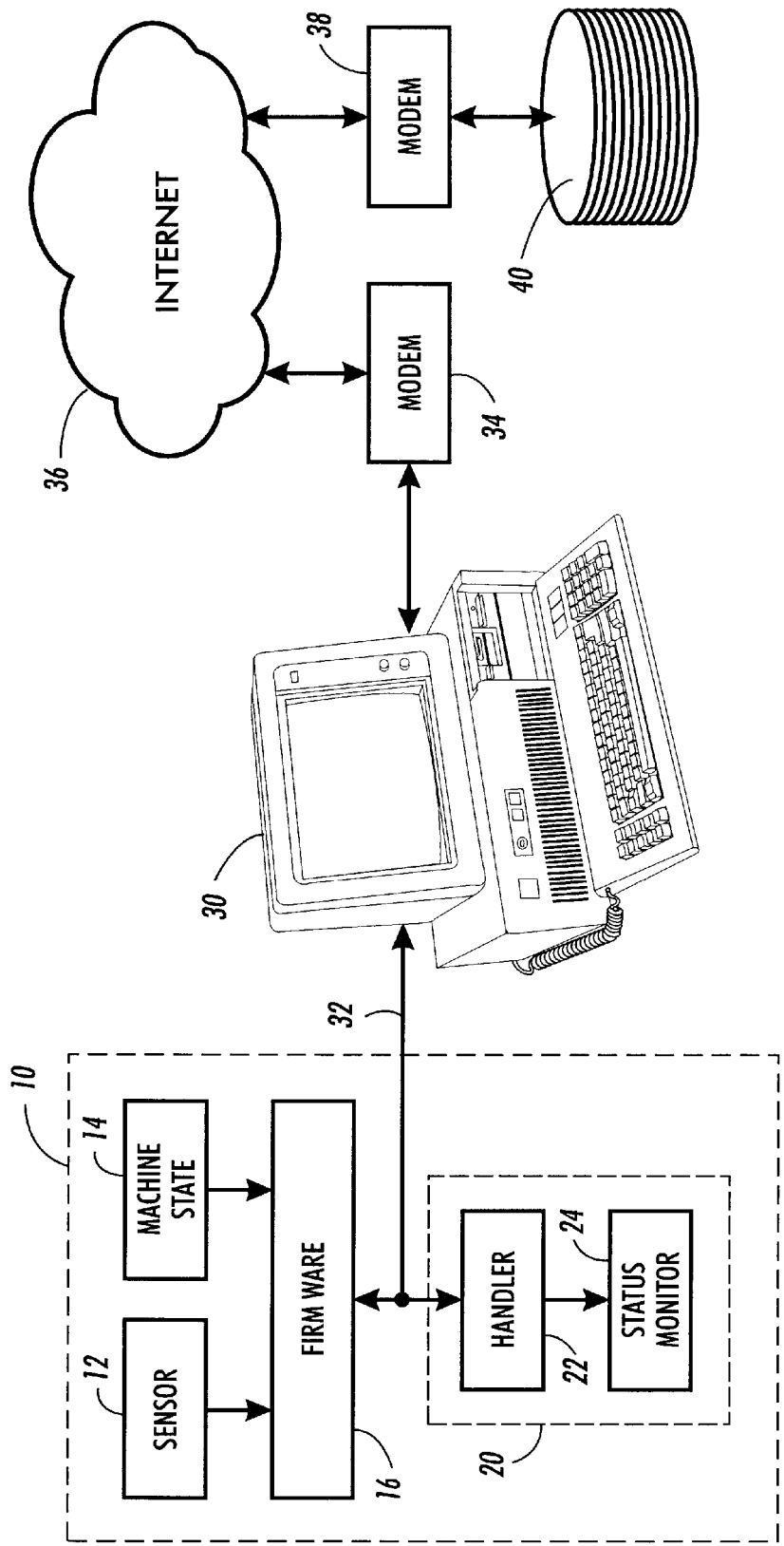
FIG. 2 is a block diagram of a user support system according to the present invention.

In FIG. 2, a computer 30 is connected to a modem 34 to convert computer binary information to analog telephone signals. Computer 30 may be a stand alone device or may be incorporated in a marking device such as a machine or peripheral 10. In addition, the marking device user may be connected to the Internet 36. Computer 30 has an Internet browser installed and operating thereon (i.e., a software module that runs on the computer to interface the user to the Internet). Internet 36 access may be through an Internet Service Provider (ISP). Typically, an ISP maintains a point of presence (POP) in the user's local telephone system to give the user a local telephone number to call. In this case, the modem 34 is a telephone modem, and under user control the browser causes modem 34 to place a call to the POP. The POP is linked to the IPS's main service center by trunk lines. The ISP's main service center has a bank of modems (not shown) to reconvert the analog telephone signals into computer binary information, and a computer (also not shown) to connect to the Internet backbone (a digital or binary communications system, also not specifically shown). The Internet backbone includes an Internet pier (i.e., terminal) where properly formatted digital signals from the ISPs main service center are launched onto the Internet backbone. The user, through his browser, may access any site on the Internet based on a URL. Everything from the POP to the Internet backbone is covered by the representation of Internet 36 in FIG. 2. Other communication systems and protocols may also be used to link the system to a user, supplier, vendor, manufacturer, or third party. For example, ISDN (integrated services digital network), DSL (digital subscriber line), and cable telephone systems may be used.

In addition, a user may communicate with a server 40 that is connected to the Internet through a modem 38. Modem 38 may be connected to the Internet either directly or indirectly through an ISP. The server 40 may perform a variety of functions, for example, a manufacturer may use their server 40 for registration of a new peripheral or publishing information about the peripheral.

A peripheral 10 (e.g., fax, copier, printer and scanner device) may be sold to the user with installation software. The user may physically connect peripheral 10 to a computer 30, and then load and execute the installation software. In addition, the installation software may be loaded on the computer using an application program executed directly by the user to interact with the peripheral, and one or more driver modules (e.g., a printer driver) may be executed by another application program (e.g., a word processor).

In use, the installation software may execute a module that performs online registration. The online registration system may use a registration server of the manufacturer to provide the user with HTML formatted pages over the Internet for display on the computer 30. These pages include fields to be filled out by the user. For example, the fields may require the user's name, product name, model, and serial number. Later purchased options (e.g. additional paper trays or a document handler) may also be registered. The HTML formatted pages may also include a "send button" to be "clicked on" by the user to send the filled out fields to the registration server in order to complete the online registration.

Figure 5:
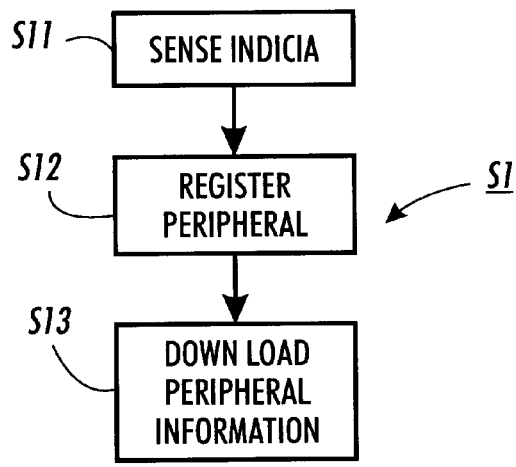
FIG. 5 is a flow chart of a registration process of the invention.

Turning now to FIG. 5, the installation process includes the computer 30 sensing an indicia (step S11) of machine 10 including the consumable components and reconfigurable parts. The machine 10 may include a variety of model numbers, part numbers, dates of manufacture, serial numbers, and configuration information. In addition, the indicia of machine 10 may include information such as the geographic location of the owner or location of the machine 10. Using the geographic information, the user may be routed to a particular sales site based on the geographic region. For example, users may be routed to a specific retailer, distributor, or company direct sales site depending on the location of the user, U.S. or foreign, and regional location within a certain country.

Registering the machine 10 (step S12) includes launching a communications link to connect to a registration server. The registration page is then displayed on the screen. The user fills out the information fields (e.g., the user name) and clicks on the send button. The completed registration page and the indicia of the peripheral are sent to the registration server. This results in information relating to precise configuration and date of the registered product being stored on the registration server.

At the end of online registration process S, a file of additional information directed to the registered machine 10 is downloaded from the server(S13). The downloaded information is dependent on the peripheral indicia. In this way, the latest information on the registered machine 10 may be stored in the computer 30 or the processor, software and logic system 16, and the information is directed to the precise configuration and date of the registered product. After the initial registration, user support information (e.g., frequently asked questions) may be sent to the user as support information continues to evolve throughout the product's life cycle.

The specific indicia sent during registration may be used to identify user support information in the database most useful to the operation and maintenance of a machine having a particular serial number or configuration. This permits a user to update user support information at any time.

Conditions in the machine 10 may indicate a need to replace a consumable item or part (e.g., paper, ink, toner, cartridge, printhead, drum). Using the sensed indicia from registration, an automatic electronic customer direct supply ordering mechanism can advantageously identify a replacement part or consumable item that is needed and the proper part can then be automatically ordered and sent to the user.

For example, a particular condition may be determined or derived from sensors 12 and machine state 14 via firmware 16 as shown in FIG. 2. The peripheral condition is sent by firmware 16 over bus 32 to an application program running in the computer 30. Moreover, a particular condition may be determined or derived from sensors 12 and consumable component 11 via processor, software and logic system 16 as shown and further described with respect to FIG. 8. The applications program may indicate the particular condition to the user, for example on a display screen.

Figure 3:
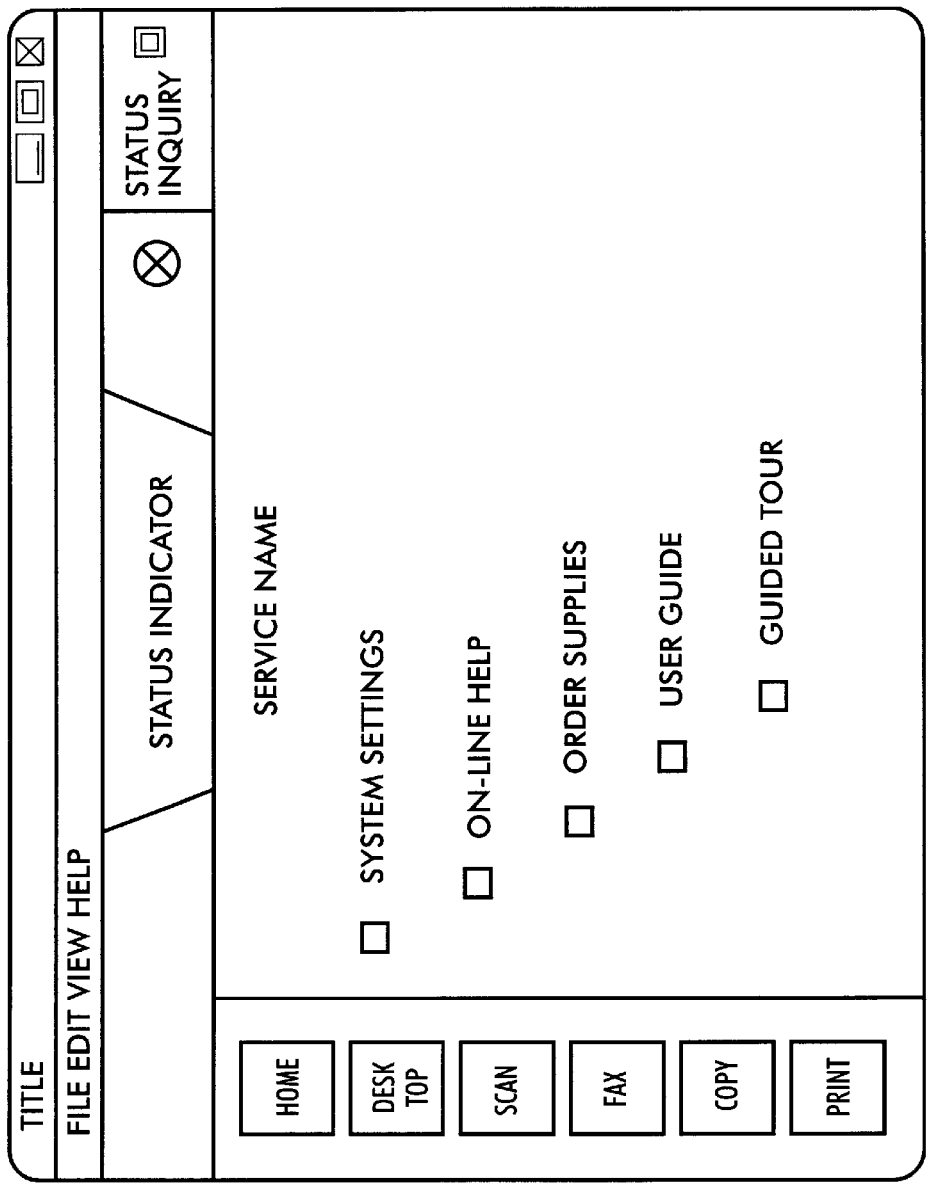
FIG. 3 is a view of a "home" screen display of an embodiment of the invention.

FIG. 3 depicts an, example of a display screen for a fax, copier, printer, scanner device. Along the top line is the title of the application program, for example, "WorkStation" or "Device". The next line is a drop down menu bar. The next line includes information specific to the exemplary work station or device. The third line, for example, includes an X indicator to indicate that a status condition has occurred that should be reviewed, and a Status Inquiry box with "button" to "click on" and get more information. On the left hand side of the display is a vertical bar with six buttons that is referred to as a service panel. The remaining portion of the screen is a context sensitive work area that is dependent on the selected service. A software and user input solution automatically connects the user to a part supplier, a consumable item, manufacturer, or a consumable item vendor for efficiency, convenience, and timely ordering or inquiry.

The service panel may have any number of buttons. In one embodiment, six buttons may be incorporated. For example, the first button may return the operator to the home menu screen. The next button accesses a "desktop" directory used by the present application. The next four buttons, in succession, access a scanner screen, a fax screen, a copier screen, and a printer screen.

A variety of menu choices may be depicted in the context sensitive work area of the home screen. The first menu entry may access a screen to review or modify system settings. The second menu entry accesses a screen to access online help services and user support as described further herein. The third menu entry accesses a screen to order supplies and/or upgrades from the manufacturer or a manufacturer approved supplier. The fourth menu entry accesses a digital user manual with hyperlinked information and help files. The fifth menu entry accesses a simplified guided tour and interactive demonstration of the peripheral's operation. The system setting screen provides for setting up various device settings that would otherwise need hard buttons. Preferably, a link to maintenance and print driver setup screens is provided.

Figure 4:
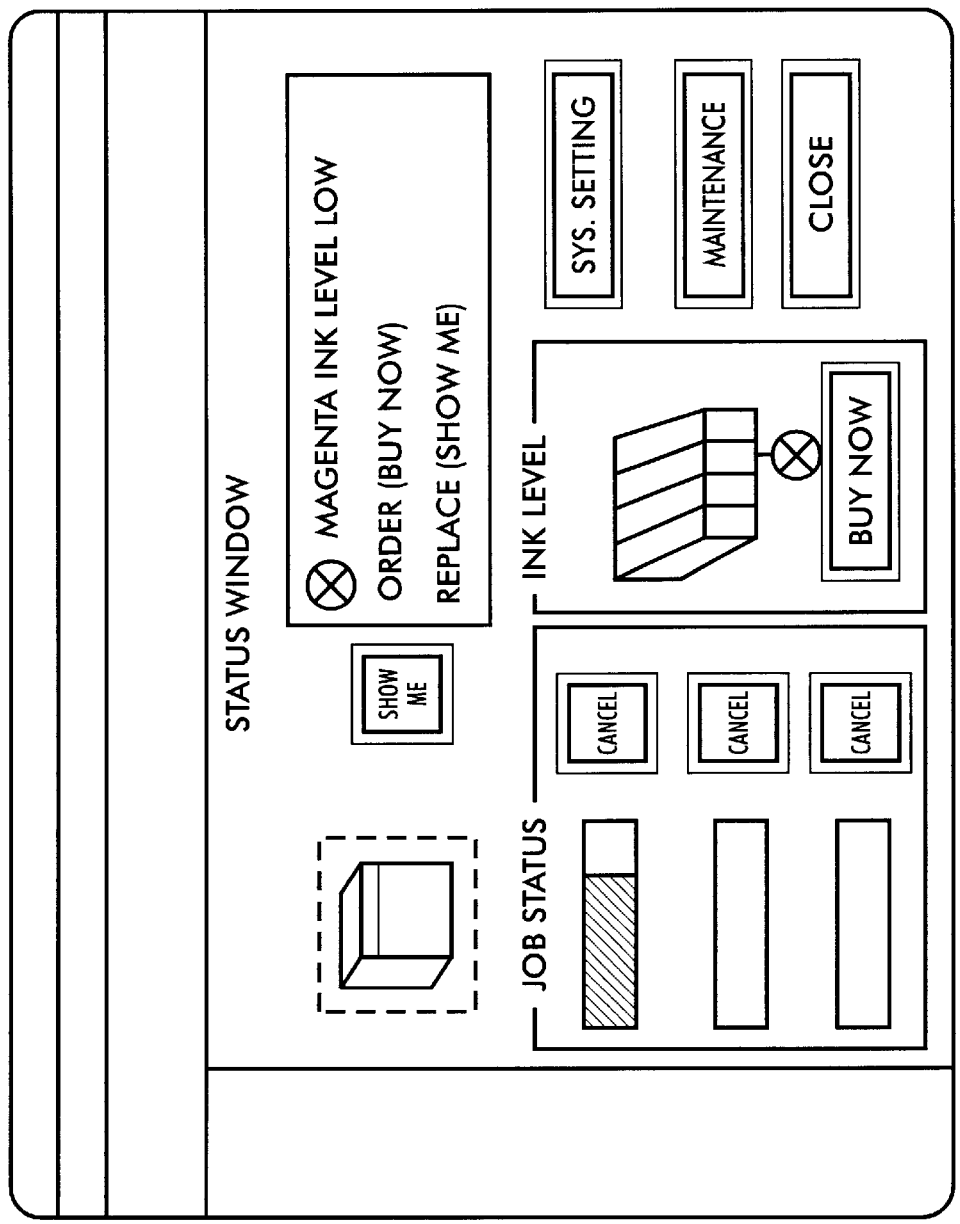
FIG. 4 is a view of a "status window" of a screen display of an embodiment of the invention.

FIG. 4 depicts the work area (i.e., status window) of the status screen. When the status inquiry button is clicked from a screen, the status screen window appears. The top of the status screen window includes two areas in the upper half: an icon display of the machine and a condition sub-window with a "Show Me" button. The icon shows the device in it's current state. If there is a problem (e.g. paper jam) it will indicate an error state. Pressing the "Show Me" button will run an animation of the icon showing how to clear the jam or correct a different problem. The animation data would be streamed from local memory or from a website. The user or machine condition can be used to determine which context sensitive help such as text, video, or audio communication to use from the website. A condition, for example, indicated by the X, explained as a "Magenta Ink Level Low", and two action options are given. The first option is ordering another magenta ink cartridge using the "Buy Now" button, and the second option is replacing the cartridge using the "Show Me" button.

For example, the bottom of the status window may include three areas in the lower half: a job status sub-window, an ink level sub-window with a "Buy Now" button, and three miscellaneous buttons (system settings as a short cut to change settings, maintenance button to access a diagnostics screen and a close button). The job status sub-window shows three jobs as an example, showing the portion completed. Preferably, some indicia of the job, such as a file name, is displayed under the portion completed. Next to each job is a cancel button that enables the user to optionally cancel the job.

It should be appreciated that the screens depicted in FIG. 3 and 4 are representative screen embodiments, and are not meant to limit the invention defined by the claims.

Figure 6:
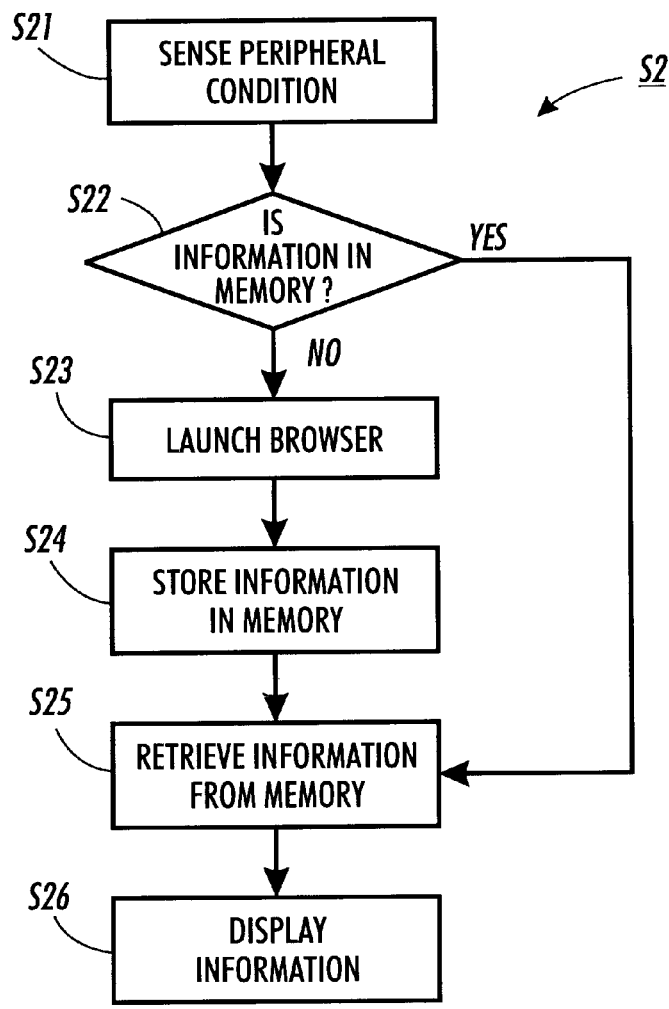
FIG. 6 is a flow chart of a user support information update process of the invention.

When a user accesses the status window and clicks the "Show Me" button, the application program may access replacement instruction information related to replacing a customer replaceable unit, for example, the magenta ink cartridge. FIG. 6 depicts this "Show Me" process as step S2. In step S21, the application program senses the particular peripheral condition. The application program running in computer 30 receives the peripheral condition over the bus 32 from the firmware 16 (FIG. 2). In step S22 (FIG. 6), the application program checks to see if the information is already present in the memory of computer 30. If the information is not present, the application program in step S23 launches an embedded or an external communications browser to access the manufacturer's server or vendor's server at an address defined by the peripheral condition. For example, the address might be:

www.manufacturer.com/product/xxx, where "product" is the peripheral indicia or something derivative therefrom, and "xxx" is the peripheral condition (i.e., magenta ink level low), code, or something derivative therefrom.

The browser accesses a web page on the manufacturer's server that is identified by "/product/xxx". In this way the information provided is not only specific to the product configuration of the peripheral as it exist in the product's life cycle, but is also specific to the particular condition sensed. Then, the server provides the browser with additional information about the condition which is stored temporarily in the computer's memory (step S24, FIG. 6). The additional information may be text, but preferably includes illustrations and even photographs. It may include audio clips (e.g., using .wav format) and it may include video segments using any of the available formats. A goal is to make it look to the user as if a technician on the other side of the computer screen is showing the user how to replace the magenta cartridge in the user's specific machine.

Audio and video clips require large storage areas. While it may be possible to store in the computer's memory a complete audio and video clip for several conditions, it is unlikely that all possible conditions will be economically storable in the computer's memory, although improvements in technology may solve this problem. However, a manufacturer's server, may be much larger and may include clips for all possible conditions, for each configuration of each product line that is supported.

In step S25, the additional information is retrieved from memory and in step S26 that information is displayed to the user. It should be appreciated that the memory of the computer 30 may include an area that is to be used to save the most frequently used "Show Me" files. For example, a memory area large enough to store 10 average sized "Show Me"files may be reserved in the computer's memory (e.g., a disk memory). A criteria for managing this memory area is established to fill the memory area when there is sufficient space for a new "Show Me" file, and to delete a past "Show Me" file to make room for a new "Show Me" file when needed dependent on the age of the file and the product cycle.

The server help database for a product line with a greater number of installed products will mature faster than for a product line with fewer number of installed products. The user has available information about the date of manufacture of the particular peripheral configuration that his own peripheral has, and this can be used to determine the time elapsed since manufacture as a suggestion of how many peripherals of this configuration have been sold. However, the manufacturer is in possession of actual information on how peripheral of the particular configuration have been sold, and thus how old a user help file needs to be to be consider stale. A combination of user and manufacturer information may be used to set a "stale threshold" for deleting a stale user help file. A second stale threshold may also be used in step S22. If the information stored in memory is available but regarded stale by according to the second threshold, step S22 may proceed to steps S23–S26 anyway to download the latest update on the user help information.

The user can click on a "maintenance" button. On doing so, a maintenance screen appears, and the user can select and execute any of several self diagnostic routines. The installation software installs a diagnostic module that is more or less and executive that calls very specific sub-modules to test each part of the machine. The specific diagnostic options depend on the specific configuration of the peripheral and are downloaded from server 40 in the exact same manner as user help information is downloaded. The present invention benefits from the use of the indicia and condition to specify a URL address that exactly matches the user's peripheral and condition. In this way, diagnostics may be performed quicker. Then, when a failed part is isolated, the "Buy Now" button appears and a replacement part may be ordered immediately or automatically as discussed below. The user may use the "Show Me" button to see how to replace the part when the part arrives.

Figure 7:
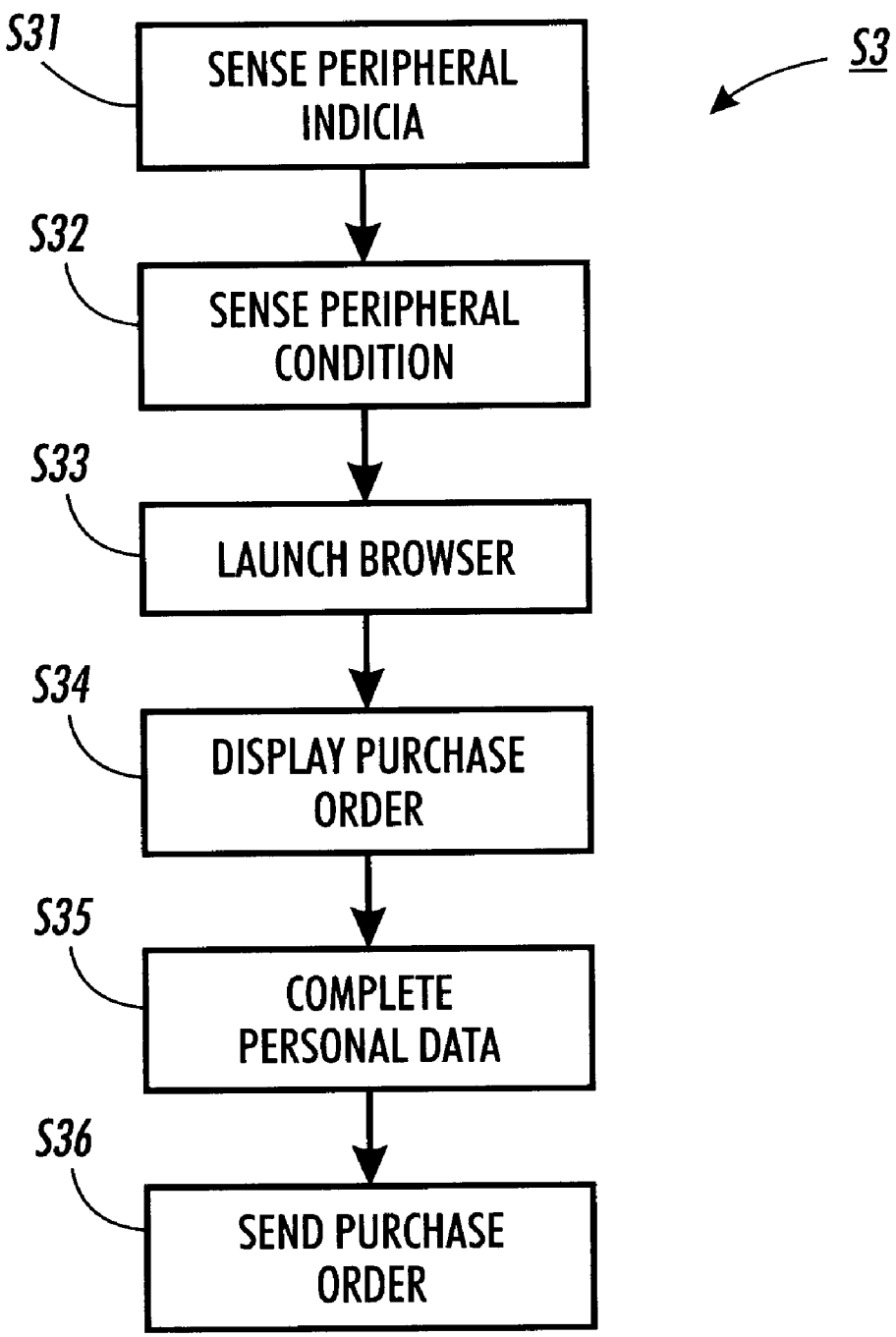
FIG. 7 is a flow chart of an online purchase order process of the invention.

When a user clicks on the "Buy Now"" button, either from FIG. 4 or from a maintenance screen, the application program enters purchase order sequence S3 (FIG. 7). In FIG. 7, when the buy now button is clicked, the application program has already sensed the peripheral indicia S31 (as in S11, FIG. 5) and the peripheral condition S32 (as in S21, FIG. 6). Then at S33, the application program launches a browser to access a purchase order page or screen from the manufacturer's server 40 based on the peripheral indicia and the detected peripheral condition. The purchase order screen is automatically partially filled out at server 40 with the part number to be ordered based on the peripheral indicia and condition. At S34, the browser displays the screen to the user. At S35, the user selects such online purchasing options as method of shipment, payment on account or by credit card, etc. For example, the user may enter a credit card authorization and request overnight express shipment. When the user has filled out the purchase order screen, at S36 the browser sends the purchase order to the manufacturer's server (40, FIG. 2). Alternatively, when the user has filled out the purchase order screen, at S36 the application launches an e-mail module to send the purchase order data to the manufacturer's server (40, FIG. 2). When the purchase order is received at server 40, the order is confirmed on the user's browser screen or the order is confirmed by a responsive e-mail.

Alternatively, the user personal information (e.g., name, address, shipment method, etc.) may be automatically entered by the application's program. For example, this information may be entered and saved in computer 30 during online registration and modified, if necessary, using the modify settings screen. Step S35 automatically enters the user personal information (including account or credit card numbers), and step S36 is a screen with a single button to confirm the desire to purchase. The user click on the buy now button, then clicks on the confirm purchase order button (step S36) and is e-mailed a purchase or confirmation and receives the part the next day (depending on shipment instructions).

The condition may be used to indicate when a consumable has been exhausted (e.g., paper tray empty) or a consumable has reach a predetermined threshold (e.g., magenta ink level low). Preferably, the condition indicates when the consumable has reached a threshold in time to reorder before the consumable is completely exhausted.

In an alternative embodiment, the application module has a monitor module that is called each time a job is sent to the printer to track how many pages have been printed and/or how much ink has been expended in each color since the last time the consumable has been replenished. The monitor module includes an "inventory sub-module" to recorded each time the consumable has been replenished and to deduct consumption of the consumable as the jobs are printed. The monitor module causes an indication of a status condition to be displayed when the consumables are expected to be below a threshold based on the inventory sub-module. The user can then navigate through the screens to the status screen and order more of the consumable by clicking the "Buy Now" button.

The server 40 may forward an order to a supplier local to the user's location or the server 40 may process the order and ship directly to the user. Server 40 knows the address of the user from the purchase order. With pre-arranged contracts with networks of office supply retailers and mail order houses, server 40 is kept aware of the level of inventory on hand at the retailer, and can confirm availability before sending the shipment order to the retailer.

Furthermore, using "cookie technology" developed for browsers, the application program examines the cookies for office supply retailers that the user has already used for supplies (e.g., when the user buys supplies online from the retailer). Such retailer can become a preferred distributor for the manufacturer's supplies. If accounts are established with the retailers that carry the desired part, the application program may inquire of the user at the time the user clicks on the "Buy Now"button whether the user want to order from the preferred retailer on account.

Figure 8:
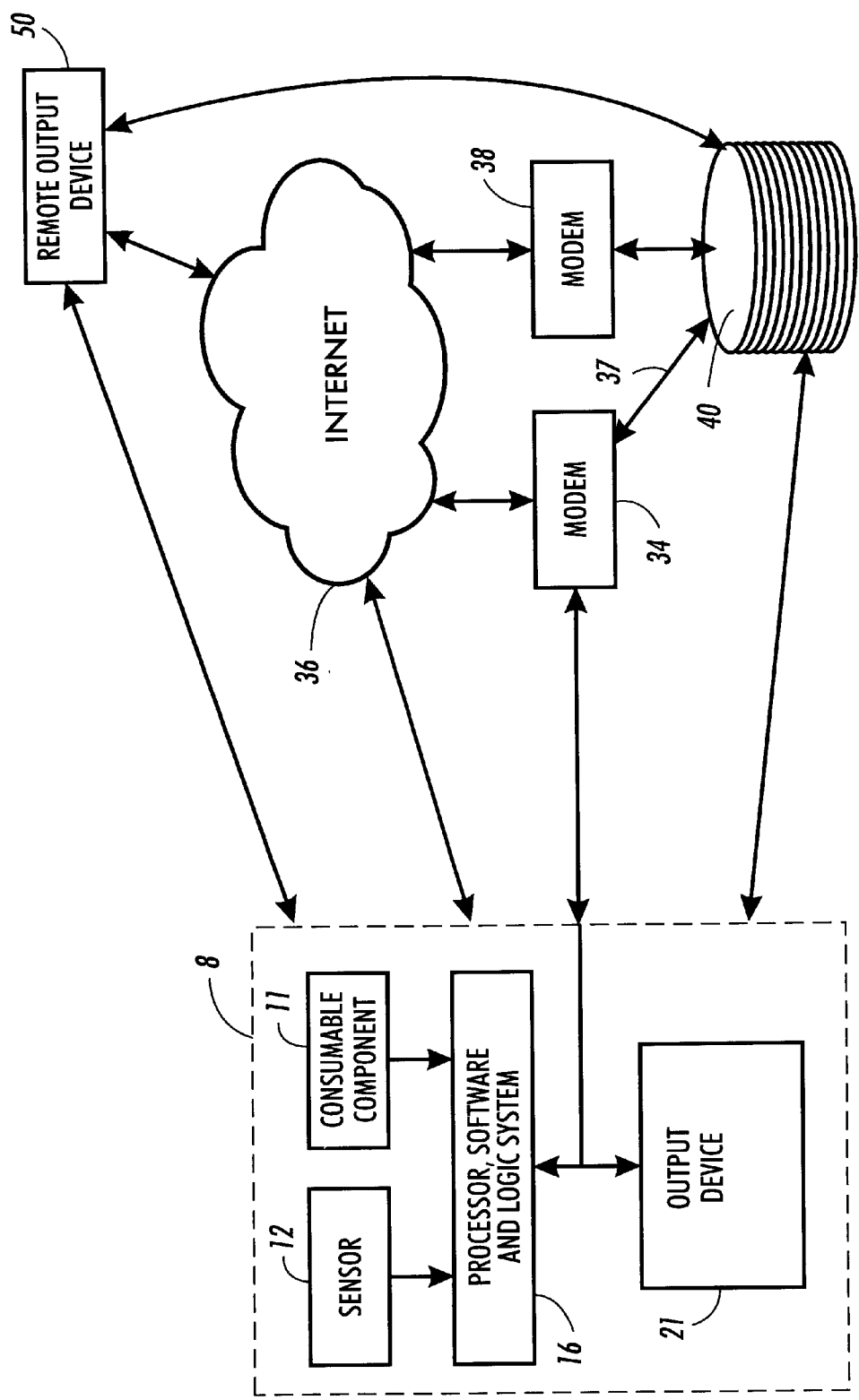
FIG. 8 is a diagram of a system according to the present invention.

Turning now to FIG. 8 is a system for automatic electronic ordering of a consumable component 11 for a marking apparatus 8. Illustrated is an example of a system including a marking apparatus 8 and a remote output device 50 linked together by a communication system. The marking apparatus 8 may include an output device 21 such as a monitor or display, a consumable component 11, a sensor 12, and a processor, software algorithm, and logic system 16. The output device 21 may be used to communicate with a user or a remote output device 50. Alternatively, communications from the marking apparatus 8 may bypass the output device 21. Moreover, the output device 21, sensor 12, and processor, software algorithms, and logic system 16 may be located externally from the marking apparatus 8, for example, in an associated device or in a remote configuration which communicates with the consumable component 11. The marking apparatus 8 or a remote output device 50 may regularly or intermittently interrogate the consumable component 11 for information and then process and communicate such information to another remote output device 50 or server 40. The communication of information may operate via a hard wired connection or a wireless system. The information may be in machine readable format or human readable format. The marking apparatus 8 may include an Internet browser for communication.

A modem 34, Internet connection 36, or server 40 may be used to electronically communicate the information from the marking apparatus 8 to the remote output device 50 regarding the condition of the consumable component 11 and automatically initiate an electronic order for a replacement of the consumable component 11. The threshold conditions of the consumable component 11 may include a measure, timing, or data such as: (1) supply; (2) wear; (3) usage; (4) rate of depletion; (5) rate of wear; (5) predicted date of depletion of supply; (5) predicted date of need of consumable component 11; (6) delivery schedule of consumable component; and (7) statistical data for consumable component 11.

The marking apparatus 8 may electronically initiate a purchase offer, electronically receive an acceptance of the purchase offer, and electronically form a contract with a supplier for purchase of the replaceable part or consumable component 11. The electronic transaction may include use of an electronic signature using, for example, digital technology. The system may be used in copy, printing, xerographic, electrostatographic, and marking apparatus. The consumable part may include a ink, ink cartridge, toner, toner cartridge, paper, photoreceptor cartridge, and printhead.

Moreover, the marking apparatus 8 device may communicate information relating to the condition of the consumable component 11 to a second device, supplier, user, or third party. The information may relate to: (1) a present condition of the consumable component 11; (2) a prediction of a future condition of the consumable component 11; (3) an inquiry relating to the consumable component 11; or (4) a purchase order of the consumable component 11. The marking apparatus 8 may predict a future condition of the consumable component 11 prior to sending a signal. The marking apparatus 8 may be programmed to communicate an offer to purchase a consumable component 11 and receive an acceptance of an offer to purchase a consumable component 11 prior to occurrence of certain condition. The consumable component 11 may be received by the user and installed in the marking apparatus 8 between occurrence of certain conditions. The marking apparatus 8 may request delivery of a consumable component 11 to a specified location. The marking apparatus 8 may include identified indicia relating to purchase information for the replaceable part such that the logic then automatically initiates an offer to purchase the replaceable part. The indicia may includes a method of shipment, shipping address, phone number, address, method of payment, authorization code, and credit card account number.

The system advantageously automates ordering of consumable supplies and replaceable parts for a marking apparatus 8, analog or digital. An order may be initiated based on a condition code indicating that the consumable component 11 has or will soon reach a predetermined threshold. Then, the system automatically sends an offer to purchase the replacement. This system includes sensing or predicting a condition in a marking apparatus, sending that condition to a computer or processor, and launching a communications to a second device to electronically offer to purchase the replacement part. The marking apparatus 8 may include all or part of the features and functions as previously described for FIGS. 2–7.

While this invention has been described in conjunction with various embodiments, it is evident that many alternatives, modifications, and variations thereof will be apparent to those skilled in the art. Accordingly, it is intended to embrace all such alternatives, modifications, and variations and their equivalents.

What is claimed is:

1. An apparatus comprising:
   at least one consumable component adapted to be replaceable in the apparatus;
   at least one sensor in communication with the consumable component;
   at least one processor and software logic system for identifying a condition in the at least one consumable component; and
   at least one wireless communications link associated with the at least one sensor and at least one processor and software logic system;
   wherein at least one of the at least one sensor and the at least one processor and software logic system are adapted to wirelessly communicate with the at least one consumable component and automatically wirelessly electronically communicate an authorization code for authentication and an electronic offer to purchase to a third party for a replacement of the at least one consumable component to at least one of an electronic address and a URL address defined by a condition of the at least one consumable component for a replacement of the at least one consumable component.

2. The apparatus of claim 1 wherein the at least one processor and software logic system includes instructions for occurrence of threshold conditions relating to the consumable component, the threshold conditions including at least one of: (1) supply; (2) wear; (3) usage; (4) rate of depletion; (5) rate of wear; (5) predicted date of depletion of supply; (5) predicted date of need of consumable component; (6) delivery schedule of consumable component; and (7) statistical data for consumable component.

3. The apparatus of claim 1 further comprising an output device adapted to communicate with the at least one communication link and receive a communication relating to at least one of a present condition and a prediction of a future condition of the at least one consumable component for use by at least one of a user, supplier, manufacturer, and third party.

4. The apparatus of claim 3 wherein the apparatus and electronic order system is adapted to electronically initiate and form a contract with a supplier for purchase of a consumable component using an electronic signature.

5. The apparatus of claim 4 wherein the apparatus is at least one of a copy device, printing device, xerographic device, and marking device.

6. The apparatus of claim 3 wherein the electronic offer to purchase is in at least one of a human readable and computer readable format.

7. The apparatus of claim 5 wherein the at least one consumable component is at least one of an ink cartridge, toner cartridge, photoreceptor cartridge, paper, and printhead.

8. An imaging apparatus comprising:
   at least one consumable part, the at least one consumable part having a first condition upon installation, at least one intermediate condition after use, and a third condition when a replacement of the at least one consumable part is substantially necessary; and
   a software and sensor system wirelessly associated with the at least one consumable part for: (a) electronic monitoring of the condition of the at least one consumable part; and (b) sending a signal relating to the condition of the at least one consumable part to a device;
   wherein the software and sensor system is adapted to wirelessly electronically communicating an electronic signature and an offer to purchase a replacement of the at least one consumable part at an occurrence of at least one of the first condition, intermediate condition, and third condition to at least one of an electronic address and a URL address defined by a condition of the at least one consumable part for a replacement of the at least one consumable part.

9. The imaging apparatus of claim 8 wherein the software and sensor system is adapted to predict a future condition of the at least one consumable part prior to electronically conveying the offer to purchase.

10. The imaging apparatus of claim 8 wherein the device is adapted to communicate an offer to purchase at least one consumable part prior to an occurrence of the third condition.

11. The imaging apparatus of claim 8 wherein the imaging apparatus is adapted to request delivery of the at least one consumable part to a specified location.

12. The imaging apparatus of claim 10 wherein an acceptance of the offer to purchase the at least one consumable part occurs prior to the third condition.

13. The imaging apparatus of claim 8 wherein the at least one consumable part is delivered to the user between the first condition and the third condition.

14. The imaging apparatus of claim 8 wherein the electronic communication includes at least one of: (1) a present condition of the at least one consumable part; (2) a prediction of a future condition of the at least one consumable part; (3) an inquiry relating to the at least one consumable part; and (4) an offer to purchase the at least one consumable part.

15. A xerographic imaging system comprising:
   a xerographic apparatus including a development station and at least one replaceable part; and
   a processor and wireless communications link associated with the xerographic apparatus;
   wherein the processor includes logic and is adapted to: (a) monitor a condition of the replaceable part associated with the xerographic apparatus; and (b) automatically wirelessly initiate an authorization code for authentication and an electronic offer to purchase a replacement part for the replaceable part upon identification of a threshold condition in the replaceable part to at least one of an electronic address and a URL address defined by a condition of the at least one replaceable part for a replacement of the at least one replaceable part.

16. The imaging system of claim 15 wherein the communication of the offer is made through at least one of a modem, Internet, and a processor.

17. A peripheral apparatus comprising:
   a marking apparatus including a sensor and software system to electronically sense a condition in the peripheral apparatus and to electronically communicate information relating to the sensed condition to an address defined by the condition, the sensor and software system including logic adapted to initiate a purchase offer defined by the condition and provide an electronic signature to authenticate the purchase offer to at least one of an electronic address and a URL address defined by a condition of at least one consumable component for a replacement of the at least one consumable component.

18. An imaging apparatus comprising:
   development station;
   at least one replaceable part in the imaging apparatus; and
   a sensor and software system adapted to electronically sense a condition in the at least one replaceable part and to electronically communicate information relating to the condition to an address defined by the condition, the sensor and software system including; (a) indicia relating to at least one of; (1) method of shipment, (2) shipping address, (3) phone number; (4) address, (5) method of payment; (6) authorization code; (7) credit card account number; and (8) return electronic address for the at least one replaceable part; and (b) logic to automatically initiate an offer to purchase; wherein the imaging apparatus is adapted to automatically electronically communicate to a third party an offer to purchase and an electronic signature to at least one of an electronic address and URL address defined by the condition for a replacement part for the at least one replaceable part upon occurrence of the defined condition.

19. The imaging apparatus of claim 18 wherein the at least one replaceable part is at least one of ink, ink cartridge, toner, toner cartridge, photoreceptor cartridge, and printhead.

20. A cartridge for use in an electrostatographic apparatus, the cartridge comprising:
   a housing; and
   a sensor and software system associated with the housing, the sensor and software system adapted to electronically identify a present condition and a predicted future condition in the cartridge and to electronically communicate information relating to an identified condition to an address defined by the identified condition, the sensor and software system adapted to automatically electronically offer to purchase a replacement for the cartridge including an electronic signature to authenticate the offer upon identification of a threshold identified condition in the cartridge to at least one of an electronic address and a URL address defined by a condition of the cartridge for a replacement of the cartridge.

21. An electrostatographic apparatus comprising:
   a photoreceptor adapted to be replaceable in an electrostatographic apparatus;
   at least one sensor in communication with the photoreceptor;
   at least one processor and software logic system for identifying a condition in the photoreceptor; and
   at least one communications link associated with the at least one sensor and at least one processor and software logic system;
   wherein at least one of the at least one sensor and the at least one processor and software logic system are adapted to communicate with the photoreceptor and automatically electronically communicate an electronic offer to purchase to a URL address defined by an occurrence of a threshold condition of wear in the photoreceptor for replacement of the photoreceptor.

22. The apparatus of claim 21 wherein the at least one communications link is wireless.

23. An apparatus comprising at least one consumable component adapted to be replaceable in the apparatus;

at least one sensor in communication with the consumable component;

at least one processor and software logic system for identifying a condition in the at least one consumable component; and at least one wireless communications link associated with the at least one sensor and at least one processor and software logic system;

wherein at least one of the at least one sensor and the at least one processor and software logic system are adapted to wirelessly communicate with the at least one consumable component and automatically electronically communicate an electronic offer and an electronic signature to at least one of an electronic address and a URL address defined by a condition of the at least one consumable component for a replacement of the at least one consumable component.

* * * * *